O. L. WILLIAMS.
PLANTER.
APPLICATION FILED JULY 27, 1916.

1,270,577.

Patented June 25, 1918.
2 SHEETS—SHEET 1.

WITNESSES
Edw. S. Hall.
Samuel Bailey

INVENTOR
Oscar L. Williams.

BY Richard B. Owen,
ATTORNEY

O. L. WILLIAMS.
PLANTER.
APPLICATION FILED JULY 27, 1916.

1,270,577.

Patented June 25, 1918.
2 SHEETS—SHEET 2.

INVENTOR
Oscar L. Williams.

WITNESSES
Edw. S. Hall.
Samuel Bailey.

BY Richard B. Owen.
ATTORNEY

UNITED STATES PATENT OFFICE.

OSCAR L. WILLIAMS, OF COOSADA, ALABAMA.

PLANTER.

1,270,577.  Specification of Letters Patent.  Patented June 25, 1918.

Application filed July 27, 1916. Serial No. 111,710.

*To all whom it may concern:*

Be it known that I, OSCAR L. WILLIAMS, a citizen of the United States, residing at Coosada, in the county of Elmore and State of Alabama, have invented certain new and useful Improvements in Planters, of which the following is a specification.

This invention relates to planters, and has for its principal object to provide an implement of this character which will plant, cover, fertilize and pack the earth upon the planted seed.

The invention consists in the provision of a seed receptacle arranged above a colter, the colter being provided with an arm for covering the seed as the planter is moved along a row; a fertilizer receptacle arranged to distribute fertilizer upon the row after the grain has been covered; an arm for entirely covering and smoothing the earth over the seed, and a roller for packing the seed in the earth.

It is another object of the invention to provide novel means for planting the seed in spaced hills along a row and to provide means to prevent any seed from becoming planted at random.

Another object of the invention is to provide means to move the combined covering and smoothing means from engagement with the earth when the planter is not in use.

Another object of the invention is to provide means for raking up and positively insuring of the fertilizer being distributed along the row.

A further object of the invention is to provide means forming the fertilizer receiving and distributing means to permit of fertilizer of various characters being used.

Still another object of the invention is to provide an implement of the character which is simple in construction, thoroughly reliable and efficient in operation, and which is cheap and easy to manufacture.

With the foregoing and other objects in view, the invention consists in the novel features of construction, combination and arrangement of parts, as will be hereinafter more fully described, illustrated in the accompanying drawings and claimed:—

Figure 1:
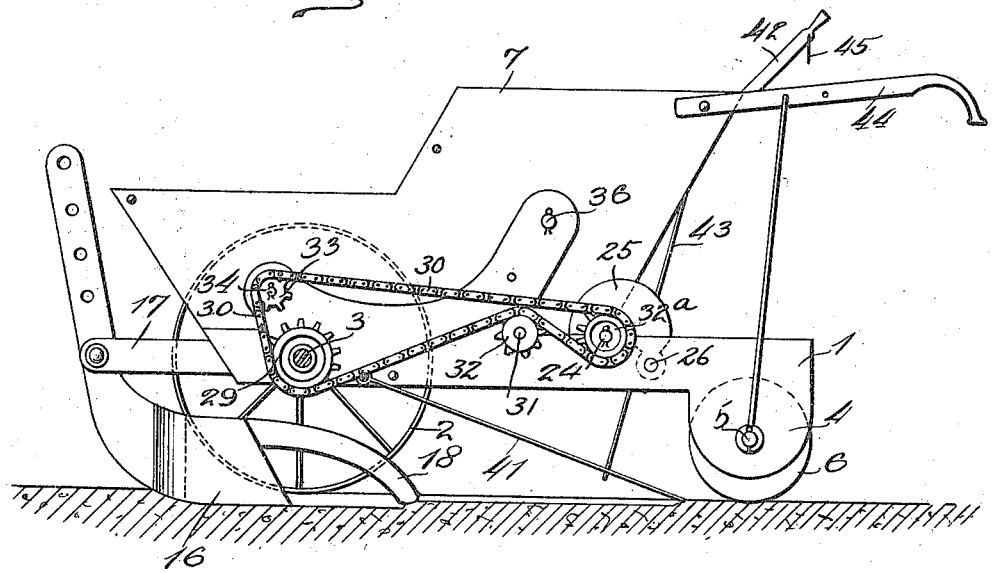
Figure 1 is a side elevation of a planter constructed in accordance with the invention.
Figure 2:
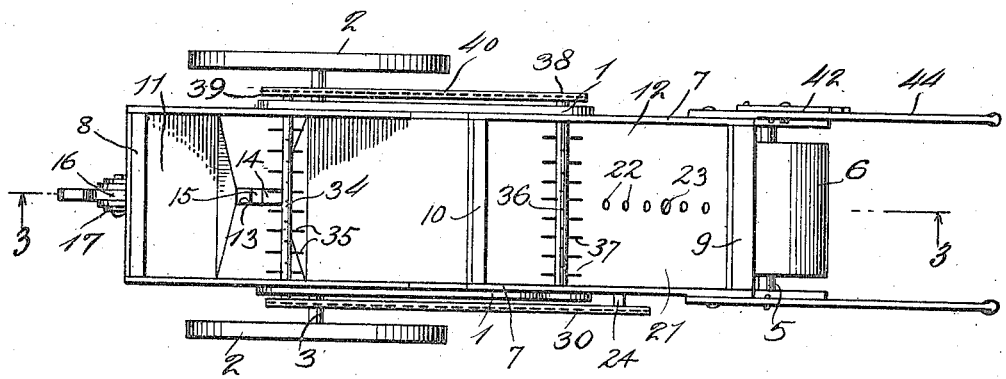
Fig. 2 is a top plan.
Figure 3:
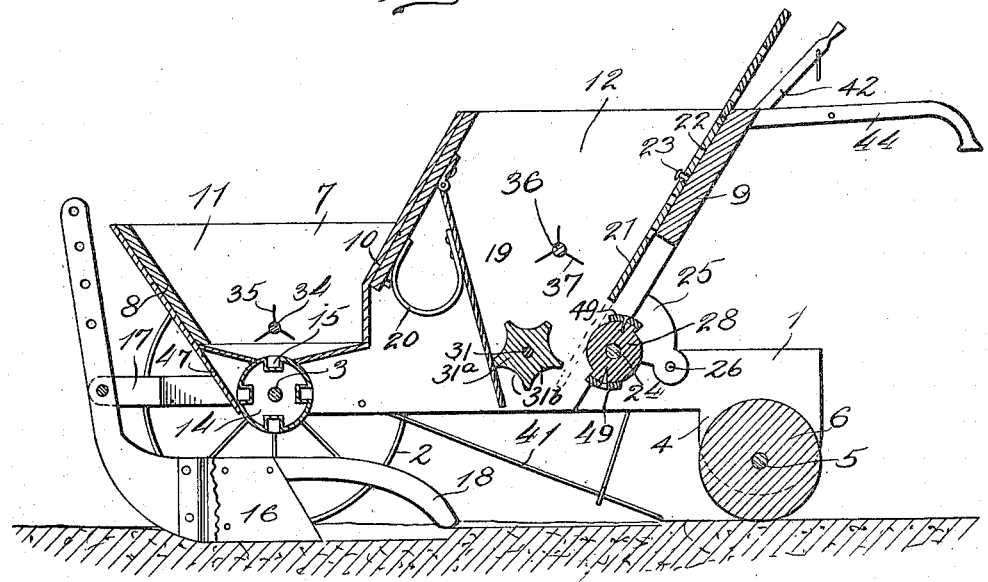
Fig. 3 is a vertical longitudinal section therethrough.

Referring to the drawings by numerals, wherein is illustrated the preferred embodiment of my invention, 1—1 designate the side frame members of the planter which are of similar construction and which are supported above the ground at their forward ends by means of wheels 2 on an axle 3 which extends transversely through the frame members. Each of these frame members is provided at its rear end with downwardly extending brackets 4 forming bearings for a shaft 5 upon which is mounted a roller 6, the roller being arranged between the frame members and serving to support the rear ends thereof as will be understood.

Containers for the seed to be planted and for the fertilizer to be distributed thereover are adapted to be arranged upon the frame members, and these containers are formed by securing upon the inner faces of each of the frame members, sides 7 of similar construction, the said sides being connected at their front and rear ends as at 8 and 9 respectively and having a transverse partition arranged therebetween, as at 10, to provide seed and fertilizer receptacles or containers 11 and 12 respectively.

The forward or seed container 11 is provided with a closed bottom having an opening 13 therein to permit the seed to pass therefrom.

Arranged upon the axle 3 directly beneath the opening 13 in the bottom of the seed container is a drum 14 which is provided upon its outer face with a plurality of spaced seed receiving recesses 15. As the planter is moved along a row the seeds are fed through the opening 13 and into the recesses 15 which convey and drop the seed in predetermined quantities between the sides of a colter 16.

The colter 16 is of the usual construction and is secured to the planter in any desired manner, as by means of the arm 17. This colter is provided with an arm 18 which extends rearwardly therefrom and is curved downwardly to engage with the earth as the colter passes along a row to partly cover the seed dropped by the drum 14.

Secured to the partition 10 and extending downwardly at an angle toward the rear of the planter is a plate 19 which is yieldably supported by means of a leaf spring 20 which is secured thereto at one end and has its opposite end in engagement with the partition.

A plate 21 is mounted upon the inner face of the rear end 9 and is movable over said face. This plate 21 is provided with a plurality of openings 22 through which a pin 23 is adapted to be passed to secure the plate in any desired vertically adjusted position relatively to the rear end 9 to adjust the width of the space between the lower end of this plate and the bottom of the container 12.

Figure 4:
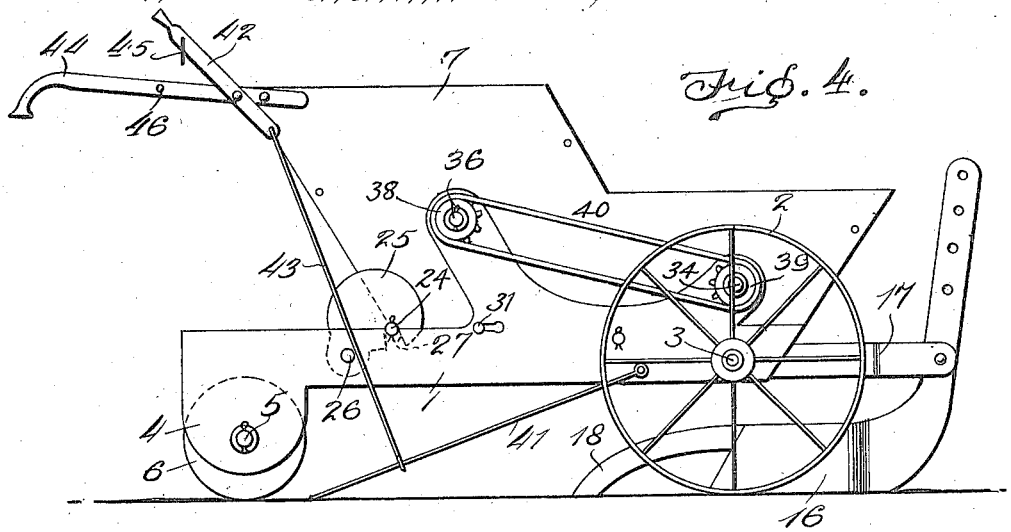
Fig. 4 is a side elevation looking at the opposite side from Fig. 1.

Recesses are formed in the upper edges of the side frame members 1 to provide bearings for a transversely extending shaft 24 which is prevented from accidental displacement therefrom by means of hook members 25 which are pivoted as at 26 to the frame members and which have recesses 27 therein the walls of which are adapted to engage the upper face of the shaft as is clearly illustrated in Fig. 4 of the drawings. This shaft 24 is arranged in the rear of the plate 21 and has rigidly mounted thereon at the bottom of the receptacle, a fertilizer distributer 28.

Parallel with shaft 24 and in front of the same is a shaft 31 journaled in the frame and adapted to be shifted horizontally to and away from shaft 24. Keyed on the shaft 31 is a distributing drum 31ª having pockets 31ᵇ in its peripheral surface, said drum being designed to distribute stable manure from the container 12. The plate 19 is held against the drum 31ª by spring 20 and plate 21 may be adjusted to and from the drum as occasion demands. When commercial fertilizer is to be distributed, the drum 31ª is removed by loosening the fastening key and withdrawing shaft 31.

The axle 3 has fixed thereon adjacent one side of the frame a sprocket wheel 29 about which is trained a chain 30. This chain passes about the under side of the sprocket 29 and thence over a sprocket 32 on the shaft 31 from where it extends rearwardly and over a second sprocket 32ª upon the shaft 24. This chain then extends forwardly and over a sprocket 33 upon one end of a transverse shaft 34 and then back to the sprocket 29.

The shaft 34 extends transversely of the sides 7 and is arranged directly over the opening 13 in the lower wall of the seed container, agitating fingers 35 being carried by and extending radially from said shaft to stir up and keep the seed in a loose condition within the container so that the same will feed freely.

A second transversely extending shaft 36 is arranged within the fertilizer container and is provided with radially extending arms 37 which are adapted to operate upon the fertilizer in a manner similar to the arms 35 on the shaft 34 when this shaft is put in motion.

A sprocket 38 is carried upon one end of the shaft 36 and a similar sprocket 39 is carried upon the same end of the shaft 34. These sprockets are connected by a chain belt 40 so that a rotary motion is transmitted from the shaft 34 to the shaft 36.

Pivoted for vertical swinging motion to any suitable portion of the planter is an arm 41 which has its free end formed into suitable shape to cover the row and smooth the earth thereover as the planter passes therealong. The free end of this arm is arranged rearwardly of the outlet opening from the fertilizer container and slightly in advance of the roller 6 so as to serve the dual purpose of covering the seed and spreading the fertilizer.

In order to provide means for raising this arm from engagement with the ground when the planter is being transported from one position to another I provide a lever 42 which is pivoted to any suitable portion of the planter, preferably in a position in convenient reach of the operator, and connect this lever with the arm by means of a rod 43. In the present instance I have shown operating handles 44 as being secured to the sides 7 and the lever 42 as being pivoted to one of said handles and in order to hold the arm 41 in spaced relation from the ground a hook member 45 is provided upon the lever which is adapted to be engaged within an opening 46 in the handle when the lever is depressed.

Mounted upon the front face of the forward end 8 of the container is a yieldable plate 47 which has its lower end extending slightly below the horizontal axis of the drum 14 with which it is engaged so that the seed within the recesses 15 will be prevented from falling from said recesses until the recesses are positioned over the colter 16, the plate being yieldable so as to permit the drum to turn freely when the recesses are filled to such an extent that the seed projects beyond the outer face thereof.

As the planter is drawn along a row by any suitable draft means the wheels 2 will rotate, thereby transmitting through the axle 3, sprockets 29, 32, 32ª, 33 and chain 34 a rotary movement to the shafts 24 and 34. The rotation of the shaft 34 transmits a similar rotary movement to the shaft 36 by means of the sprockets 38 and 39 and chain belt 40. A rotary motion is also transmitted through the axle 3 to the drum 14. The rotation of the shaft 34 causes the seed to be stirred up by the fingers thereon and as the drum 14 rotates such seed is delivered in even quantities by the recesses 15 to the colter 16 which places it in the ground in the ordinary manner, the spaced circumferential arrangement of the recesses upon the drum serving to deliver the seed at spaced intervals to the colter to provide hills as will be understood. The arm 18 then passes over the grain and partially covers the same with earth.

As the machine moves still farther along the fertilizer in the container 12 will be agitated by the fingers on the shaft 36 and will be distributed along the row through the opening between the lower ends of the plates 19 and 21, by the member 28 if using commercial fertilizer, or the drum 31ª if stable manure is being used, revolving at the bottom of the container 12.

Further movement of the planter brings the lower end of the arm 41 over the seed and fertilizer to cover the seed and spread the fertilizer thereover, after which the roller 6 passes thereover to pack the smoothed earth down and break up any small clods.

By yieldably supporting the plate 19 it will be seen that any lumps within the fertilizer not thoroughly broken up by the agitating fingers 37 will be permitted to pass through the opening between the plates.

If desired, the distributer member 28 may have plates 49 secured to its peripheral surface to better adapt it for using fertilizer of various characters, the provision of the vertically adjustable plate 21 serving to further increase the efficiency of the planter in this respect.

From the foregoing description taken in connection with the accompanying drawings, it is thought that the construction and operation of the improved planter will be clearly understood, and while I have herein shown and described one specific embodiment of my invention I do not wish to be limited thereto except for such limitations as the claims may import.

I claim—

1. An implement of the character described comprising a container, a yieldable place forming one wall of said container, a vertically adjustable plate forming a second wall for said container, said plates being arranged in spaced relation to provide an outlet opening therebetween, and revolving distributing rollers at the bottom of the container, the vertically adjustable plate when moved downwardly extending between the rollers.

2. An implement of the character described comprising a container, a vertically adjustable plate forming one wall for the container, a plate pivotally mounted and forming a second wall for the container, revolving distributing rollers controlling the passage of material between the lower ends of the plates, with one roller positioned between the plates and the second roller positioned outside the adjustable plate, and means yieldably holding the pivoted plate in an operative position.

In testimony whereof I affix my signature in presence of two witnesses.

OSCAR L. WILLIAMS.

Witnesses:
JOHN JONES RIVES,
JEROME VINCENTELLI.

Copies of this patent may be obtained for five cents each, by addressing the "Commissioner of Patents, Washington, D. C."